June 4, 1957 L. V. GUEST 2,794,647

SOUND REPRODUCING APPARATUS

Filed Feb. 11, 1952 3 Sheets-Sheet 1

INVENTOR
Lawrence V. Guest
BY
Ralph B. Stewart
ATTORNEY

June 4, 1957 L. V. GUEST 2,794,647

SOUND REPRODUCING APPARATUS

Filed Feb. 11, 1952 3 Sheets-Sheet 2

INVENTOR
Lawrence V. Guest
BY
Ralph B. Stewart
ATTORNEY

June 4, 1957 L. V. GUEST 2,794,647

SOUND REPRODUCING APPARATUS

Filed Feb. 11, 1952 3 Sheets-Sheet 3

INVENTOR
Lawrence V. Guest
BY
Ralph B. Stewart
ATTORNEY

United States Patent Office 2,794,647

Patented June 4, 1957

2,794,647

SOUND REPRODUCING APPARATUS

Lawrence Vincent Guest, Old Hill, England, assignor to Birmingham Sound Reproducers Limited, Old Hill, England, a British company Application February 11, 1952, Serial No. 270,916

Claims priority, application Great Britain February 13, 1951

6 Claims. (Cl. 274—10)

The present invention relates to apparatus for use in the reproduction of sound from a succession of disc records of various sizes fed singly in succession on to a turntable by downward movement from the lower end of a stack carried co-axially on a spindle extending upwards from the centre of the turntable, and to automatically operated apparatus of this kind wherein the extent of the inward movement imparted to the reproducer transversely of the plane of the turntable, as a preliminary to the engagement of the stylus with the record to be played, is made to correspond with the radius of that record, by settable means adapted to function as a temporary stop for the inwardly moving reproducer, setting of said means being determined by the engagement or non-engagement therewith of the edge of that record as it moves from the lower end of the stack to the playing position on the turntable.

The object of the invention is to provide an improved and simplified form of apparatus of this kind suitable for use with two but more particularly with a number in excess of two different sizes of disc records.

In accordance with the invention there is provided for use in sound reproducing apparatus of the kind referred to, reproducer locating means comprising a fixed support, a stop member mounted for movement on said fixed support and biased in one direction thereon and provided with one set of two or more spaced abutment surfaces, a detent member mounted for rocking movement and having a blade adapted to extend into the path of movement of records between the stack and the turntable whereby the detent may be rocked to an extent dependent upon the size of a record moving downwards from the stack on the spindle onto the turntable, and caused to engage one or other of the spaced abutment surfaces to retain the stop member in a corresponding position and a further set of spaced abutment surfaces on the stop member for selective engagement by a part movable with the reproducer as the latter is moved from an outermost position inwards transversely of the plane of the turntable, to temporarily interrupt said transverse movement at a point corresponding to the position in which the stop member is held by the detent member.

The invention is illustrated in the accompanying drawings in which—

Figure 1:
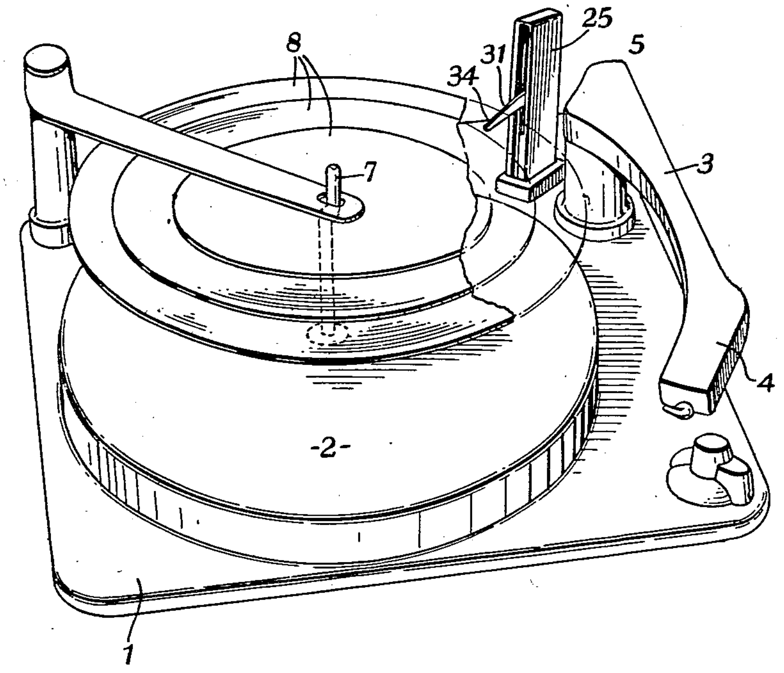
Fig. 1 is a perspective view of a sound reproducing machine embodying the invention.

Referring to the drawings the machine illustrated comprises a motor board 1 supporting on its underside a driving motor of any convenient form (not shown) for driving a conventional turntable 2. A pick-up arm 3 carrying a pick-up 4 at its free end is mounted at its rear end 5 (Fig. 1) for movement about a vertical pivot to permit movement of the pick-up 4 transversely of the turntable, and also about a horizontal pivot for vertical movement to permit the pick-up 4 to be raised and lowered relative to the turntable 2.

A stationary spindle 7 extends upwards from the centre of the turntable 2, said spindle being of any well known form capable of supporting a stack of superposed disc records 8 with their central aperture axially aligned, and including known automatically operated means for releasing said records singly in succession from the lower end of the stack to slide down the spindle 7 into the playing position on the turntable 2.

The machine also includes automatic mechanism of known form (not shown) adapted on completion of the reproduction of a record, to be driven by the motor and to execute a cycle of operations consisting in raising the pick-up arm 3 to disengage the pick-up from the played record, thereafter swinging the pick-up arm 3 outwards to a position outside the path of the largest record to be played, sliding down the spindle 7, releasing the lowest record from the stack 8 to permit it to fall on to the turntable 2 or on to previously played records thereon, swinging the raised pick-up arm 3 inwards to a position over the edge of the record now to be played and lowering the pick-up into engagement with the record now to be played.

In the arrangement according to the invention the vertical pivotal mounting for the pick-up arm 3 is formed by a spindle 9 arranged for rotation, and also for limited vertical movement in a bored stud 10 fixed on the motor board 1, and a bent metal bracket 11 comprising a vertical part 12, and top and bottom horizontal end parts 13 and 14 engaged over the spindle 9.

Figures 2, 3:
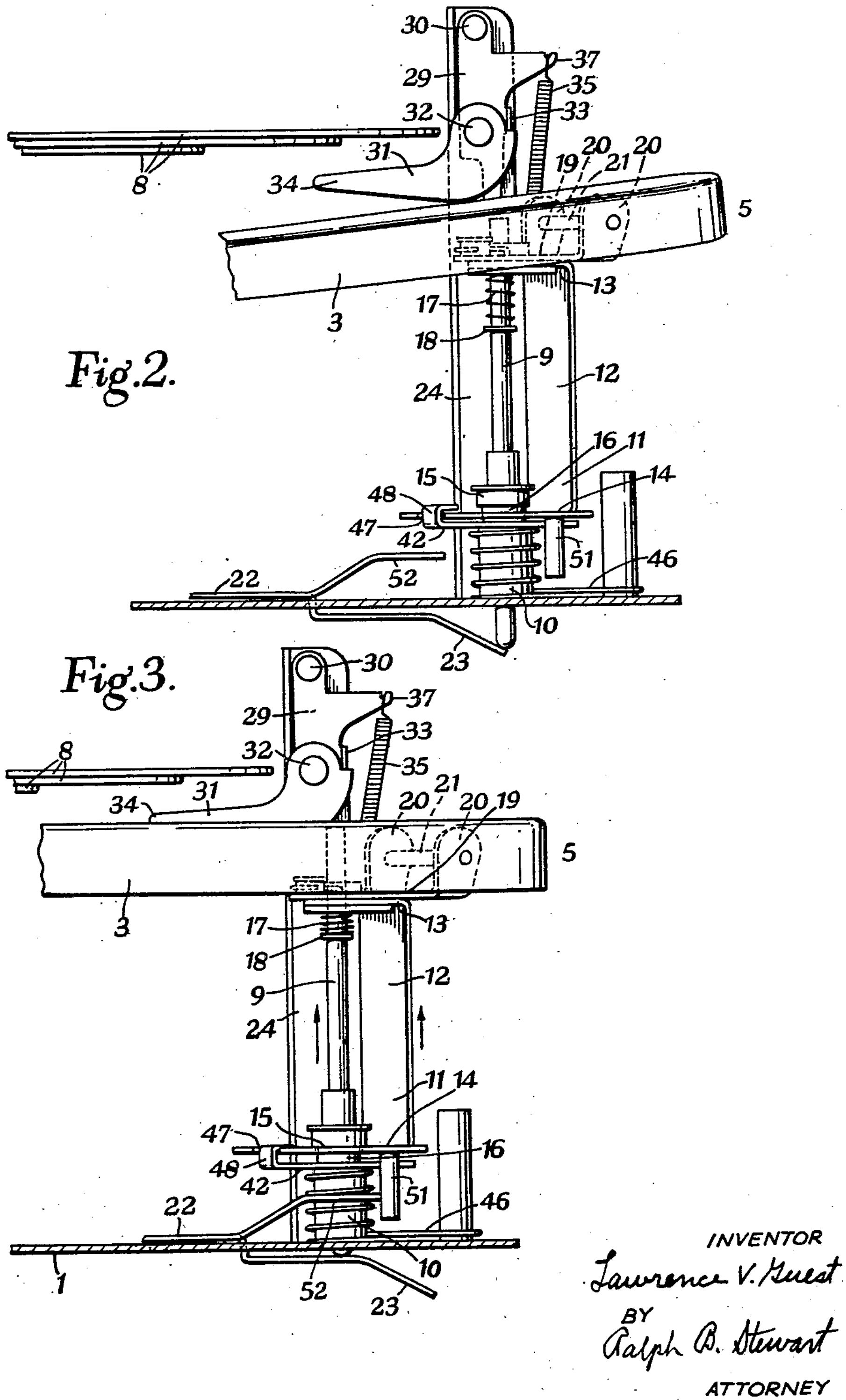
Fig. 2 is a view in side elevation showing the pick-up arm mounting and the mechanism for imparting raising and lowering and transverse swinging movement to the pick-up arm.
Fig. 3 is a view similar to Fig. 2 but showing the pick-up arm raised and swung outwards from above the turntable.

A plate 19 is fixed to the upper surface of the upper end part 13 of the bracket 11 and is provided with a pair of upstanding lugs 20 forming supports for a horizontal pivot pin 21 on which the pick-up arm 3 is mounted. The pick-up arm is of channel section, open at the underside, and the parts 13 and 19 are contained within the channel, and the upper end of the spindle 9 in the normal or playing position of the pick-up arm 3 extends to a position close to but spaced from the inside surface of the upper wall of the pick-up arm as shown in Fig. 2.

The bracket 11 is capable of both rotational and endwise vertical movement on the spindle 9, the endwise movement being limited by engagement of the bottom end part 14 with a shoulder 15 on a collar 16 fixed on the spindle 9.

A compression spring 17 surrounds the upper end of the spindle 9 and is compressed between the top end part 13 of the bracket 11 and an abutment 18 fixed on the spindle.

The automatic mechanism driven by the motor of the machine includes a horizontally reciprocating bar 22 guided on the motor board 1, and having an inclined end 23 projecting downwards through a slot in the motor board 1 (Figs. 2 and 3) and arranged to engage below the lower end of the spindle 9 in such manner that the latter is raised and lowered as the bar 22 is reciprocated. Raising of the spindle 9 causes the upper end thereof to engage the arm 3 to rock it about the horizontal pivot 21 to move it from the position shown in Fig. 2 to that shown in Fig. 3 and raise the pick-up 4 from engagement with a record on the turntable 2.

Figures 4, 5:
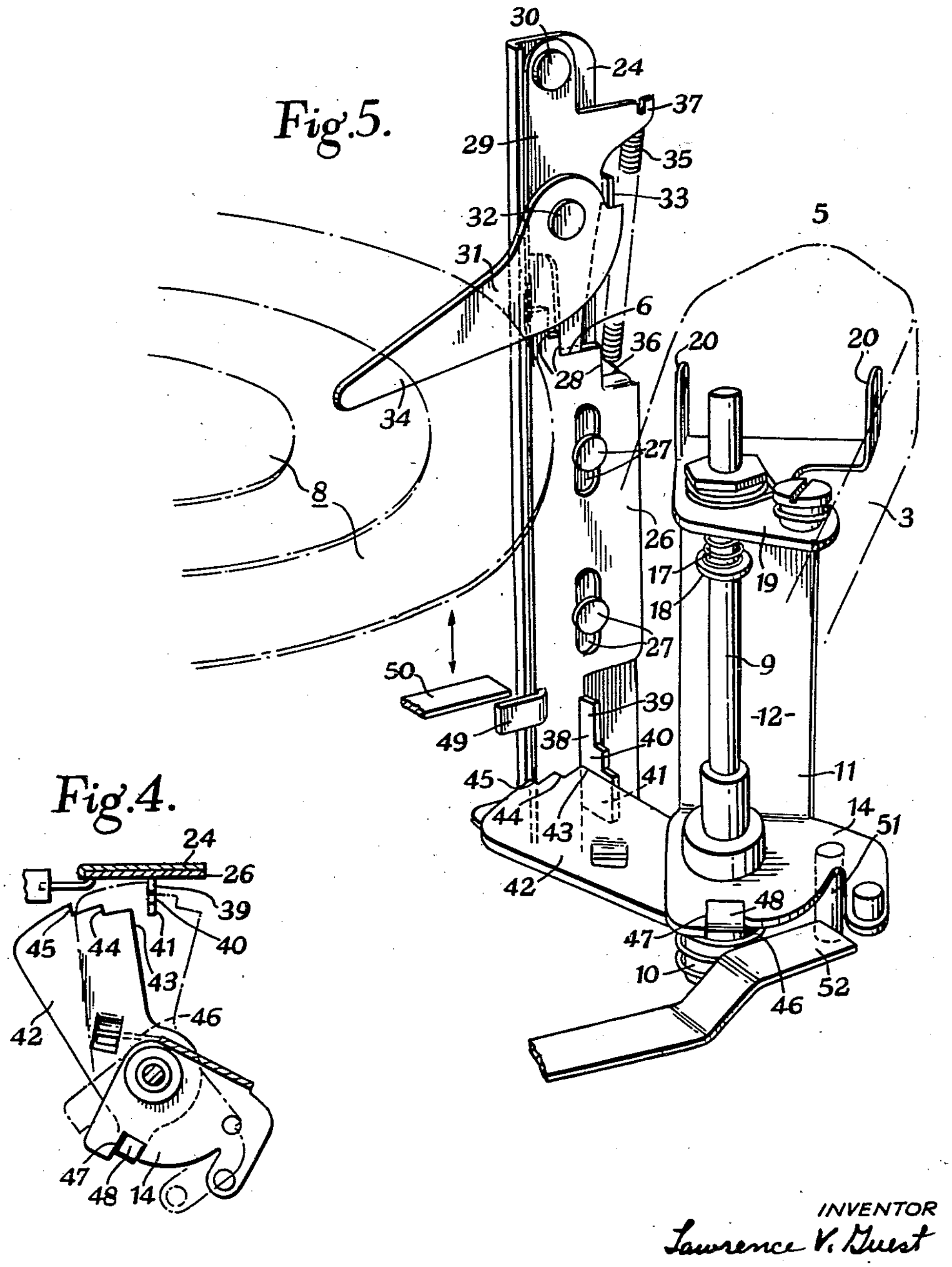
Fig. 4 is a view in plan of parts of the pick-up arm swinging and locating mechanism and Fig. 5 is a view in perspective showing the pick-up arm locating means.

On the motor board 1 in a position suitably spaced from the edge of the turntable 2 is fixedly mounted an upwardly extending flat post 24 (Figs. 2, 3 and 5) concealed within a cover 25 (Fig. 1). On one surface of the post 24 is mounted a stop member 26 (Fig. 5) connected with the post 24 by pin and slot connections 27 so as to be capable of up and down movement on the post 24. At the upper end of the stop member 26 are formed a number of stepped notches 28, corresponding in number with the number of different sizes of records to be played by the apparatus, three such notches 28 being provided in the case illustrated (Fig. 5).

At the upper end of the flat post 24 is mounted a plate 29 arranged for movement about a pivot 30, the lower end 6 of said plate 29 functioning as a detent co-operating with one or other of the notches 28 in the stop member 26.

On the plate 29 is monted a finger 31 pivoted at 32 on the plate 29, said finger 31 being of a form such as to be held by gravity against a stop lug 33 on the plate 29 in which position the operative end 34 of said finger 31 projects through a slot in the cover 25 and to within a given distance from the record supporting spindle 7, and between the lowest disc record of the stack 8 carried on the spindle 7 and the surface of the turntable 2 (Fig. 1). A tension spring 35 extends between an arm 36 on the stop member 26 and an arm 37 on the pivoted plate 29 tending on the one hand to urge the stop member 26 upwards on the post 24 and on the other hand to urge the plate 29 about its pivot 30 in the direction to thrust the finger 31 towards the spindle 7 and the lower end 6 of the plate 29 into engagement with one of the notches 28 on the stop member 26 (Fig. 5).

The arrangement is such that with the lower end 6 of the plate 29 engaged with the uppermost notch 28 a record of the smallest size to be played can slide downwards along the spindle 7 into the playing position on the turntable without touching the finger 31, whilst the edge of any record of larger size sliding down the spindle 7 engages and rocks the finger 31 together with the plate 29 about the pivot 30 on the fixed post 24.

When the finger 31 and plate 29 are rocked by a record, the lower end 6 of the plate 24 is disengaged from the upper notch 28 and the stop member 26 is drawn upwards by the spring 35 and according to the size of the falling record and therefore the extent of the rocking movement imparted to the finger 31 and the plate 29, the upward movement of the stop member 26 will terminate when either the intermediate notch 28 engages the detent-forming lower end 6 of the plate 29 (as is shown in Fig. 5) or the lowest notch 28 engages with the detent-forming lower end 6 of the plate 29.

At the lower end of the stop member 26 there is formed a lateral projection 38 extending towards the pick-up arm pivot spindle 9, said projection 38 being formed with a number of steps providing three laterally spaced surfaces 39, 40 and 41.

On the pivot spindle 9 and between the upper end of the bored stud 10 and the collar 16 fixed to the spindle 9 is rotatably mounted a plate 42 having the form of a quadrant the outer periphery of which is formed to provide three edges 43, 44, 45 located at successively increasing radial distances from the axis of the spindle 9 and such that the first edge 43 is capable of engaging the lowest and widest surface 41 on the projection 38 on stop member 26, the second edge 44 with the intermediate surface 42 on the projection 38 and the third edge 45 with the uppermost and narrowest surface 39 on the projection 38, according to the vertical position taken by the stop member 26 on the post 24.

The quadrant 42 is urged by a spring 46 in the clockwise direction in Fig. 5 about the spindle 9.

In the edge of the horizontal end part 14 of the bracket 11 is formed a notch 47 (Fig. 4) across which extends an upwardly extending hook lug 48 formed on the edge of the quadrant 42, the said hook lug 48 extending from below to above the end part 14 and enveloping the edge thereof when the said end part 14 is in its lowermost position as shown in Fig. 2 so that said end part 14 in this position is capable of rotation relative to the quadrant 42.

In the raised position of the bracket 11 in which the lower end part 14 is in engagement with the flange 15 on the collar 16, the sides of the notch 47 are in the plane of the upper portion of the hook lug 48 as shown in Fig. 3 so that the end part 14, and therefore the bracket 11, and the quadrant 42 are constrained to move in unison but with some small degree of lost motion, the notch 47 being made slightly wider than the upper part of the hook lug 48, on the quadrant 42.

The stop member 26 is also provided with a lateral projection 49 (Fig. 5) near its lower end and the automatic mechanism driven by the motor of the machine to carry out the cycle of automatic operations includes a lever 50 the end of which is arranged to be momentarily lowered from the position shown in Fig. 5 to engage and depress the lateral projection 49 on the stop member to re-set the latter to its lowest position in which position it is held by the detent-forming lower end 6 of plate 29 and the quadrant 42 is capable of making its maximum movement, clockwise in Fig. 5 until the edge 45 at the maximum distance from the axis of the quadrant 42 engages the upper and narrowest surface 39 on the projection on the stop member 38.

The bottom end part 14 of the bracket 11 is provided with a downwardly extending pin 51 (Figs. 2 and 3) for engagement by the upturned extremity 52 of the above described reciprocating member 22 forming part of the automatic mechanism, for rotating the bracket 11 about the spindle 9 to swing the pick-up arm 3 and pick-up 4 outwards after the pick-up has been raised from engagement with a played record.

The operation of the machine is as follows:

With a stack of disc records 8 of various sizes, for example 7", 10" and 12" diameter, carried on the spindle 7 above the turntable 2 and a record disc on the turntable in course of being played, the stop plate 26 will be in any one of its three alternative positions on the fixed post 24 according to the size of record last fed from the stack and being played, being held in that position by the engagement of the detent-forming lower end 6 of the plate 29 with the corresponding one of the three notches 28 on the stop member, under the pull of the spring 35.

When playing of the record on the turntable 2 has been completed the automatic mechanism driven by the motor is put into operation in any well known manner, to carry out the cycle of automatic operations.

The reciprocating member 22 is caused to move from the position shown in Fig. 2 to that shown in Fig. 3, the inclined portion 23 on its downwardly extending end sliding below the lower end of the spindle 9 so that the latter is raised, and its upper end engages the pick-up arm 3 to move it about the horizontal pivot 21 to disengage the pick-up 4 from the played record. As the spindle 9 is raised, the spring 17 is compressed but lifting of the bracket 11 by the spring 17 is prevented by the engagement of the edge of its bottom end part 14 below the upper part of the hook 48.

As movement of the member 22 continues, a horizontal part thereof moves beneath the bottom of the spindle 9 so as to maintain said spindle 9 and the pick-up 4 raised, and the upwardly projecting end 52 of the reciprocating member 22 moves into engagement with the pin 51 beneath the bottom end part 14 of the bracket 11, to rotate the bracket 11 and the pick-up arm 3 carried thereby about the spindle 9 in the direction to move the pick-up arm 3 and the pick-up 4 outwards from above the turntable 2 e. g. to a position such as is shown in Fig. 1, in which it is outside the path of a record of any size which may pass from the lower end of the stack 8 down along the spindle 7 on to the turntable 2.

During the early part of this rotational movement of the bracket 11, whilst the pick-up 4 is above a record on the turntable 2, the bottom part 14 of the bracket 11 slides freely beneath the upper part of the hook 48 on the quadrant 42.

At a given point in this outward movement of the pick-up arm 3 before it has traversed a distance which would be sufficient to pass across the edge of the smallest size i. e. a 7" record to be played, the notch 47 in the lower end part 14 of the bracket 11 comes into register with the hook 48 on the quadrant 42, whereupon the bracket 11 is caused by the previously loaded compression spring 17, to rise along the spindle 9 and bring the bottom part 14 into engagement with the shoulder 15 on the collar 16, in which position the upper part of the hook 48 on the quadrant 42 is engaged in the notch 47 in the part 14. Throughout the remainder of the outward swinging movement of the pick-up arm 3, the quadrant 42 is moved with the rotated bracket 11 (counterclockwise in Fig. 5), against the spring 46.

On completion of the outward swinging movement of the pick-up arm 3, the lever 50 is momentarily rocked, and if the stop member 26 is in any position other than its lowermost position on the support 24 (dependent on the size of the last fed and played record), the free end of the lever 50 (shown in Fig. 5) in moving downwards depresses the arm 49 to set the stop member 26 in its lowermost position, the detent-forming end 6 of the plate 24 engaging the uppermost notch 28 to retain the stop member in this lowermost set position.

In this position of the plate 24 the finger 31 projects to a maximum pre-determined extent towards the spindle 7 and below the stack of records 8 thereon.

The lowermost record of the stack 8 on the spindle 7 is now released by the automatic mechanism in known manner to slide down the spindle 7 onto the turntable.

If the falling record is of the smallest contemplated diameter i. e. 7" no contact will be made between the edge of the record and the projecting finger 34 so that no movement of the pivoted plate 29 or of the stop member 26 on the post 24 takes place.

If, however, the falling record is of a larger diameter i. e. 10" or of the largest diameter i. e. 12", the finger 31 is engaged by the edge of the falling record and rocked together with the pivoted plate 29 about the pivot 30 and to a smaller or greater extent, according to the size of the record, so that the stop member 26 is caused to rise on the post 24 under the pull of the spring 35 either to its intermediate position in which it is retained by engagement of the lower detent-forming end 6 of the plate 29 with the intermediate one of the three notches 28 (as shown in Fig. 5) or in the highest position in which it is retained by engagement of the said lower detent-forming end 6 of the plate 29 with the lowest of the three notches 28.

According to that one of the three alternative positions now occupied by the stop member 26, a corresponding one of the three alternative surfaces 39, 40 and 41 of different widths on the lateral projection 38 on the stop member 26 is now in the plane of movement of the quadrant 42.

The reciprocating member 22 is now retracted, i. e. moved to the left in Fig. 1 and is followed by the pin 51 and the rotatable bracket 11 the latter being moved in the direction to swing the pick-up arm 3 inwards, by the spring 46 acting through the quadrant 42, the upper part of the hook 48 on the quadrant being still engaged in the notch 47 in the lower end part 14 of the bracket 11.

The inward swinging movement continues until the appropriate edge 43, 44 or 45 on the end of the quadrant 42 abuts that one of the three alternative surfaces 39, 40 or 41 previously located, as described above, in the plane of movement of the quadrant 42, whereupon the quadrant 42, bracket 11, and the pick-up arm 3 are brought to a standstill in a position in which the pick-up 4 is poised with its stylus over the starting edge of the record previously dropped from the stack 8 onto the turntable 2.

The retracting movement of the reciprocating member 22 continues so that its end 52 moves away from the pin 55 and the horizontal part, and thereafter the inclined end part 23, is withdrawn from beneath the lower end of the spindle 9 so that the latter moves downwards and the pick-up arm 3 tilts about the horizontal pivot pin to lower the pick-up into engagement with the starting edge of the record to be played. As the stylus moves into engagement with the record the compression of the spring 17 between the upper end part 13 of the bracket 11 and the abutment 18 on the spindle 9 is released, due to the downward movement of the spindle 9, so that the bracket 11 is permitted to make a small downward movement on the spindle in which the bottom end part 14 of the bracket moves from the position against the shoulder 15 on the collar 16 as shown in Fig. 3 and notch 47 in said bottom end part 14 becomes disengaged from the upper part of the hook 48 on the quadrant 42 (Fig. 2).

The bottom end part 14 becomes capable of movement independently of the quadrant 42, its edge moving freely in the space between the body of the quadrant 42 and the upper part of the hook 48 Fig. 2, and the bracket 11 and the pick-up arm 3 carried thereby, rendered free to rotate about the spindle 9 in the manner necessary to enable the stylus to follow the record groove during reproduction.

I claim:

1. In sound reproducing apparatus having a reproducer mounted on a reproducer arm, the combination of a fixed support, a stop member mounted for movement on said support, resilient means biasing said stop member for movement in one direction on said support, a first set of spaced abutment surfaces on said stop member, a movable detent member for engaging any one of said first set of abutment surfaces, means controlled by movement of a record to the playing position operative to cause said detent to engage one of said first set of abutment surfaces corresponding to the size of the record to be played, a second set of spaced abutment surfaces carried by the stop member, a locator member mounted for movement in a given path into engagement with any one of said second set of abutment surfaces, resilient means urging said locator member toward said second set of abutment surfaces, releasable means coupling said locator member and said reproducer arm during movement of said locator member into engagement with one of said second set of abutment surfaces, and means controlled in timed relation with the operation of said locator member and operative to uncouple said coupling means after engagement of said locator member with one of said second set of abutment surfaces.

2. Apparatus according to claim 1 wherein the said stop member is plate-shaped and movable longitudinally of said fixed support, said first set of abutment surfaces being arranged at one end thereof and said second set of abutment surfaces being located at the other end thereof, and the locator member is mounted for movement about the axis of swinging movement of said reproducer arm and in a plane substantially normal to said stop member.

3. Apparatus according to claim 1 and including a supporting bracket for said reproducer arm mounted for rotation about, and for limited up-and-down movement on, the vertical axis of horizontal swinging movement of said reproducer arm, said locator member also being mounted for rotation about said vertical axis, and said coupling means comprising a hook formed on said locator member and a notch formed in said bracket, reciprocating vertical movement of said bracket causing said hook and said notch to move into and out of engagement.

4. In sound reproducing apparatus having a reproducer mounted on a reproducer arm, the combination of a movable locator member, releasable means coupling said locator member for movement with said reproducer arm, means to sense the size of a record to be played, an arresting member controlled by said sensing means to limit the motion of said locator member, and means controlled in timed relation with the operation of said arresting member to uncouple said coupling means after said locator member has been arrested by said arresting member.

5. Apparatus according to claim 4 and including resilient means biasing said locator member toward said arresting member, and means operable in timed relation with said sensing means to move said locator member out of engagement with said arresting member before the operation of said sensing means.

6. In sound reproducing apparatus having a reproducer mounted on a reproducer arm, the combination of a fixed support, arresting means mounted for movement on said support, resilient means biasing said arresting means for movement in one direction on said support, a first set of spaced abutment surfaces on said arresting means, a movable detent for engaging any one of said first set of spaced abutment surfaces, means controlled by movement of a record of a size above a minimum into the playing position operative to cause said detent to engage one of said first set of abutment surfaces corresponding to the size of that said record, a second set of spaced abutment surfaces on the said arresting means, a locator member mounted for movement in a given path into engagement with any one of said second set of abutment surfaces, resilient means urging said locator member toward said second set of abutment surfaces, releasable means coupling said locator member and said reproducer arm during movement of said locator member into engagement with one of said second set of abutment surfaces, and means controlled in timed relation with the operation of said locator member and operative to uncouple said coupling means after engagement of said locator member with one of said second set of abutment surfaces.

References Cited in the file of this patent

UNITED STATES PATENTS

| | | |
|---|---|---|
| 2,090,746 | Compare | Aug. 24, 1937 |
| 2,237,340 | Downs | Apr. 8, 1941 |
| 2,541,072 | Jones | Feb. 13, 1951 |
| 2,544,230 | Johnson | Mar. 6, 1951 |
| 2,576,125 | Lapish | Nov. 27, 1951 |
| 2,640,702 | Haggerty | June 2, 1953 |